United States Patent [19]

Bulley et al.

[11] 4,408,248

[45] Oct. 4, 1983

[54] PROTECTION CIRCUIT

[75] Inventors: Raymond M. Bulley, Whippany, N.J.; William F. MacPherson, Wheaton, Ill.; Robert F. Youhas, Parsippany, N.J.

[73] Assignee: Bell Telephone Laboratories, Incorporated, Murray Hill, N.J.

[21] Appl. No.: 335,623

[22] Filed: Dec. 30, 1981

[51] Int. Cl.³ .............................................. H02H 9/04
[52] U.S. Cl. ...................................... 361/91; 361/93; 361/56; 361/57; 361/111; 361/119
[58] Field of Search .................. 361/91, 93, 100, 101, 361/111, 56, 57, 119; 363/51; 340/662, 664

[56] References Cited

U.S. PATENT DOCUMENTS

| | | | |
|---|---|---|---|
| 3,341,763 | 9/1967 | Noddin | 320/39 |
| 3,475,653 | 8/1969 | Odenberg et al. | 317/16 |
| 3,626,249 | 12/1971 | Snedeker | 317/16 |
| 3,790,856 | 2/1974 | Hutchinson | 317/16 |
| 3,925,624 | 12/1975 | Earle et al. | 361/91 X |
| 4,135,223 | 1/1979 | Holmes | 361/56 |
| 4,156,263 | 5/1979 | Comerford et al. | 361/42 |

OTHER PUBLICATIONS

Article by Horst Pelka Entitled "Elektronische Ueberstromsicherungen", Elektre-Technische Zeitschrift-B, vol. 24, (1972), No. 2, pp. 34 and 35.

Primary Examiner—Reinhard J. Eisenzopf
Attorney, Agent, or Firm—Kurt C. Olsen; Jack S. Cubert

[57] ABSTRACT

A protection circuit for communication equipment connected to a two conductor communication line includes a bridge rectifier having alternating current terminals connected to the conductors and to ground. The direct current terminals of the rectifier are connected to a device responsive to a range of predetermined voltage and current conditions in the conductors for reflecting foreign electrical energy.

11 Claims, 4 Drawing Figures

4,408,248

PROTECTION CIRCUIT

BACKGROUND OF THE INVENTION

Our invention relates to the electrical protection of communication equipment and, more particularly, to improve arrangements for current and voltage overload protection.

Communication lines may carry foreign electrical energy from, for example, lighting strikes and power transmission line faults. In order to safeguard communication equipment connected to such lines, prior protection circuits may include carbon blocks, gas tubes, fuses and heat coils. Carbon blocks, however, have a limited lifetime and may become electrically noisy. Gas tubes are comparatively costly. Fuses and heat coils may be slow in operation and are not resettable.

More recently, switching or crowbar type protection circuits have been developed which include semiconductor elements. Such circuits, however, may not be adapted to the specialized protection requirements of communication circuits. A communication protector should be resistant to latching due to the constant DC supplied by a central office. In addition, if foreign voltage appears between one conductor and ground of a two conductor communication line, it is also desirable to provide balanced protection by grounding both conductors. Further, modern construction trends toward out-of-sight equipment installation urge that a protector be physically compact.

It is therefore an object of the invention to provide a reliable, compact and economical protection circuit that operates rapidly and is automatically resettable.

SUMMARY OF THE INVENTION

The invention is a circuit for protecting communication equipment connected to a two conductor communication line from foreign electrical energy which exceeds a predetermined range of voltage and current conditions. The alternating current terminals of a bridge rectifier are connected to the conductors and to ground. The direct current terminals are coupled responsive to a predetermined range of voltage and current conditions in the conductors. Foreign electrical energy on either conductor is thereby reflected back toward its source and dissipated via the conductors and ground.

DETAILED DESCRIPTION

Figure 1:
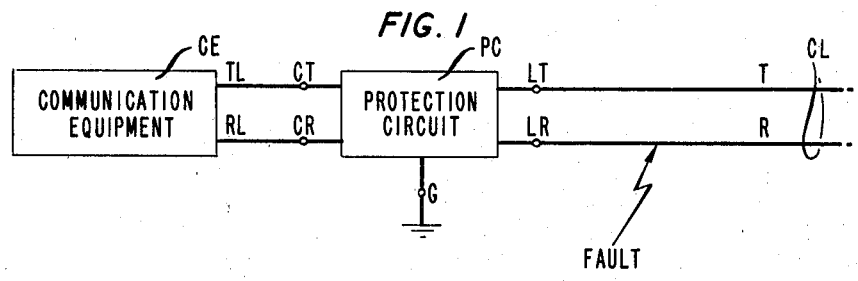
FIG. 1 is a block diagram of a protection circuit according to the invention connected between communication equipment and a communication line.

Referring to FIG. 1, communication equipment CE is connected via tip and ring leads, TL and RL, to terminals CT and CR respectively of protection circuit PC. Communication equipment CE may be, for example, central office, telephone, terminal or other station devices. Terminals LT and LR of protection circuit PC are connected to the tip and ring conductors, T and R, of communication line CL. Node G of protector CP is connected to ground. Communication equipment CE is thereby protected from foreign electrical energy due to a fault on conductors T and R.

Figure 2:
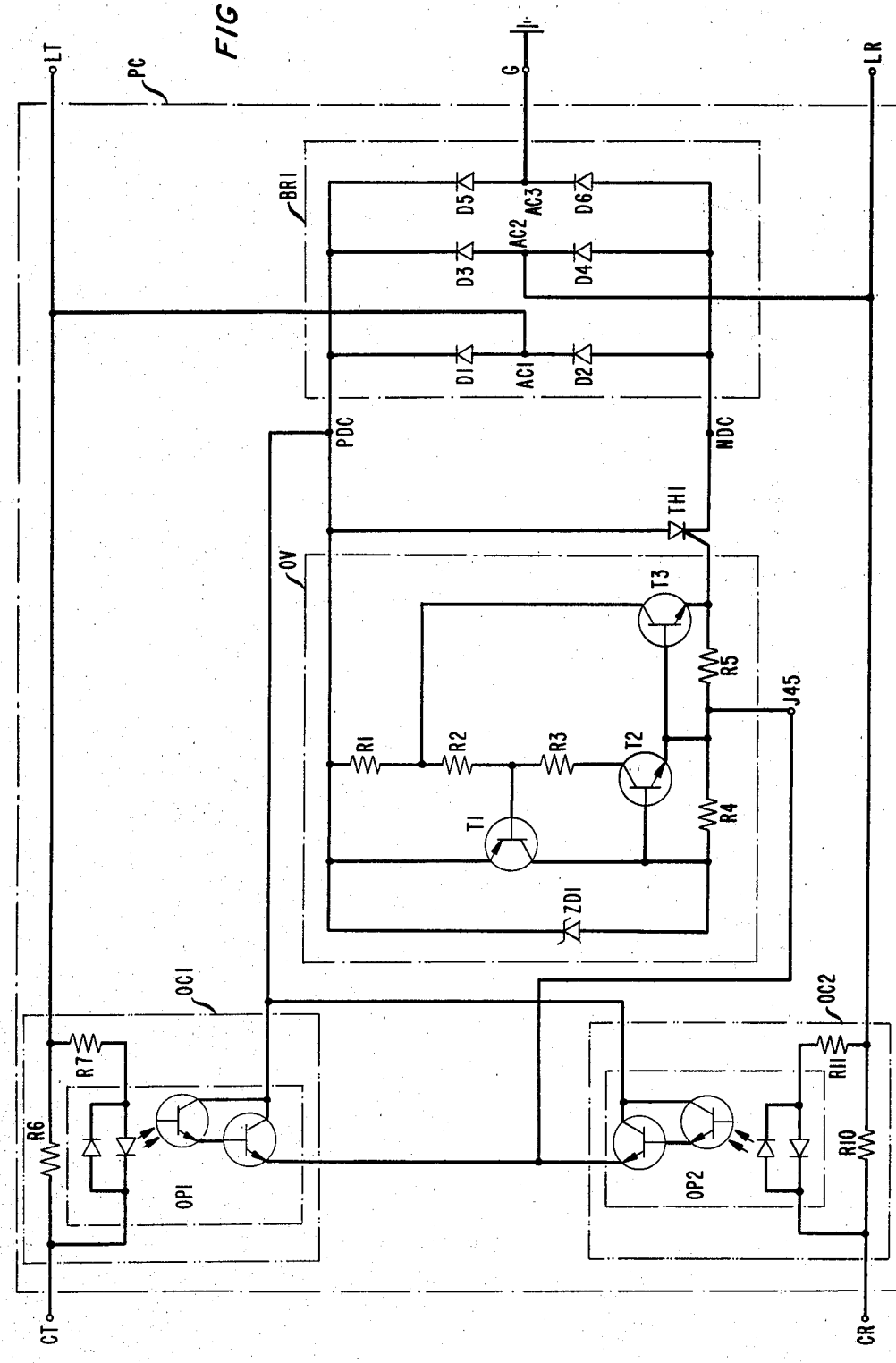
FIG. 2 is a schematic diagram of a protection circuit illustrative of the invention.

Referring to FIG. 2, protection circuit PC comprises overvoltage detection circuit OV, thyristor TH1, overcurrent detection circuits OC1 and OC2, and bridge rectifier BR1. Bridge rectifier BR1 comprises six elements, for example, semiconductor diodes D1-D6. The cathodes of diodes D1, D3 and D5 are connected together to form positive direct current terminal PDC. The anodes of diodes D2, D4 and D6 are connected together to form negative direct current terminal NDC. The anode of diode D1 and the cathode of diode D2 are connected together to form alternating current terminal AC1. Similarly, the anodes of diodes D3 and D5 are connected to the cathodes of diodes D4 and D6, respectively, to form terminals AC2 and AC3.

According to the foregoing six diode arrangement, bridge rectifier BR1 comprises the three alternating current terminals, AC1-AC3, and the positive and negative direct current terminals, PDC and NDC. Thereby, regardless of the polarity of any potential applied between terminals AC1, AC2 and AC3, the polarity of terminals PDC will remain positive with respect to terminal NDC.

Terminals AC1, AC2 and AC3 of bridge rectifier BR1 are connected to terminals LT, LR and G, respectively, of protection circuit PC. The anode of thyristor TH1 is connected to terminal PDC. Preferably, TH1 is a silicon-controlled rectifier, selected to have comparatively high gate and hold currents. The cathode of thyristor TH1 is connected to terminal NDC. Overvoltage detection circuit OV is connected between terminal PDC and the gate of thyristor TH1.

In overvoltage detection circuit OV, resistors R1, R2 and R3 are connected in series between terminal PDC and the collector of transistor T2. Transistor T2 may be, for example, a NPN type transistor. The emitter of transistor T2 is connected to the base of transistor T3 and the junction of resistors R4 and R5 at terminal J45. Transistor T3 may be, for example, an NPN type transistor. The base of transistor T2 is connected to resistor R4, the collector of transistor T1 and the anode of breakdown diode ZD1. Breakdown diode ZD1 may be, for example, a zener diode. Transistor T1 may be, for example, a PNP type transistor.

The cathode of breakdown diode ZD1 and the emitter of transistor T1 are connected to terminal PDC. The base of transistor T1 is connected to the junction between resistors R2 and R3. The collector of transistor T3 is connected to the junction between resistors R1 and R2. The emitter of transistor T3 is connected to resistor R5 and the gate of thyristor TH1.

Overcurrent detection circuit OC1 comprises resistors R6 and R7, and opto-isolator OP1. The input stage of opto-isolator OP1 may comprise, as is well known in the art, a pair of oppositely biased light emitting diodes connected in parallel. The output stage of opto-isolator OP1 may comprise a light sensitive Darlington amplifier, as is well known in the art.

Resistor R6 is connected in series between terminals CT and LT of protection circuit PC. Resistor R7 is connected between terminal LT and one side of the input stage of opto-isolator OP1. The other side of the input stage of opto-isolator OP1 is connected to terminal CT. One side of the output stage of opto-isolator OP1 is connected to terminal PDC of a bridge rectifier BR1. The other side of the output stage of opto-isolator OP1 is connected to the junction of resistors R4 and R5 in overvoltage detection circuit OV. The arrangement of overcurrent detection circuit OC1 is duplicated between terminals CR and LR by overcurrent detection circuit OC2 having resistors R10 and R11, and opto-isolator OP2.

In the absence of foreign electrical energy on conductors T or R, overvoltage detection circuit OV and overcurrent detection circuit OC are quiescent. Terminals LT and CT, and terminals LR and CR are therefore connected for normal operation. If, however, an overvoltage or overcurrent condition occurs on conductors T or R, either circuit OV or OC is operative to couple terminals LT, LR and G. Foreign electrical energy on wires T and R is thereby dissipated harmlessly rather than adversely affecting equipment connected to terminals CT and CR.

IF, for example, a positive overvoltage condition occurs at terminal LT with respect to terminal LR, current flows from terminal LT to terminal AC1, through diode D1, terminal PDC, overvoltage detection circuit OV, the gate and cathode of thyristor TH1 (as described below), terminal NDC, diode D4 and terminal AC2 to terminal LR. Similarly, if a negative overvoltage condition occurs at terminal LT with respect to ground terminal G, current flows from ground terminal G to terminal AC3, through diode D5, terminal PDC, overvoltage detection circuit OV, the gate and cathode of thyristor TH1, terminal NDC, diode D2 and terminal AC1 to terminal LT. Current flow through diodes D3 and D4 is analogous for overvoltages at terminal LR.

It follows that regardless of which conductor an overvoltage condition originates on, terminals LT, LR and G are all simultaneously coupled by overvoltage detector circuit OV and the diode arrangement of bridge BR1. This arrangement provides balanced protection, which is, as previously mentioned, advantageous for the protection of communication circuits. Due to the diode arrangement of bridge rectifier BR1, the potential between terminals PDC and NDC is always positive. It may be seen, therefore, that overvoltage detection circuit OV is responsive to the modulus of an overvoltage condition at either terminal LT or LR, that is, circuit OV is responsive regardless of the polarity of the fault.

Figure 4:
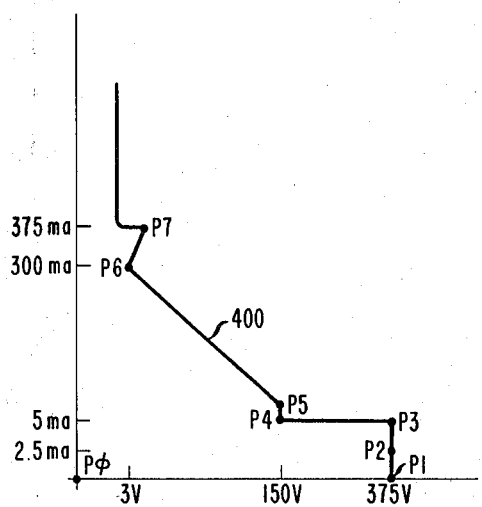
FIG. 4 is a graph showing operating characteristics of the overvoltage detection circuit in the protection circuit of FIG. 2.

More particularly, overvoltage detection circuit OV is operative in accordance with a predetermined voltage-current function as shown by curve 400 in FIG. 4. The ordinates of curve 400 correspond to current flowing between terminals PDC and NDC. The abscissas of curve 400 correspond to the voltage between terminals PDC and NDC. Points P0-P7 on curve 400 are example voltage and current conditions useful to illustrate the operation of overvoltage detection circuit OV.

In FIG. 4, overvoltage detection circuit OV is off from point P0 to P1, for example, from 0 to 375 volts at 0 ma. At point P1, the potential between terminals PDC and NDC is 375 volts. Breakdown diode ZD1 therefore begins to conduct current from terminal PDC to node NDC via the series path including resistors R4 and R5, and the gate and cathode of thyristor TH1. Since thyristor TH1 has a high gate current, it does not switch on at this time.

The voltage across resistor R4 is applied to the base-emitter terminals of transistor T2. At point P2, for example, at about 2.5 ma at 375 volts, transistor T2 turns on and conducts current from terminal PDC, through series resistors R1, R2 and R3 to the collector of transistor T2. At point P3, for example, at about 5 ma at 375 volts, sufficient voltage has developed across resistors R1 and R2 for transistor T1 to turn on.

When transistor T1 is on, current flows from terminal PDC, through the emitter-collector path of transistor T1 and into the base of transistor T2. Transistors T1 and T2 thereby drive each other to saturation from points P3 to P4, that is, from about 375 to 147 volts at 5 ma. At point P5, for example at about 150 volts at 10 ma, the voltage across resistor R5 is sufficient to switch on transistor T3. Current increases to about 300 ma from point P5 to P6 while the voltage drops from about 150 volts to about 3 volts. At point P6, at about 3 volts, transistors T1, T2 and T3 are saturated. At point P7, at about 4 volts at 350 ma, thyristor TH1 turns on.

The operation of overvoltage detection circuit OV in response to overvoltage conditions was detailed above. If an overcurrent condition occurs, on the other hand, either overcurrent detection circuit OC1 or OC2 becomes operative. When the current between terminals LT and CT, for example, exceeds a predetermined threshold, for instance, 300 ma, the modulus of the voltage across resistor R6 is sufficient to turn on opto-isolator OP1. The output stage of opto-isolator OP1 switches on and connects terminals PDC to terminal J45. Current from terminal PDC is thereby applied to the base of transistor T3. Transistor T3 switches on and its emitter current is applied to the gate of thyristor TH1. Thyristor TH1 switches on and connects terminals PDC and NDC of bridge rectifier BR1 together. A positive current path is thereby established from terminal LT, terminal AC1, diode D1, terminal PDC, the anode and cathode of thyristor TH1, terminal NDC, and either via diode D6 and terminal AC3 to ground terminal G, or via diode D4 and terminal AC2 to terminal LR. Alternatively, a negative current path is likewise established from terminal LT, terminal AC1, diode D2, terminal NDC, the cathode and anode of thyristor TH1, terminal PDC, and either via diode D5 and terminal AC3 to ground terminal G, or via diode D3 and terminal AC2 to terminal LR. Analogous paths are simultaneously established from terminal LR. Foreign energy on lines T and R in FIG. 1 is therefore reflected back toward its source without harm to communication equipment CE. The operation of overcurrent detection circuit OC2 is analogous.

Figure 3:
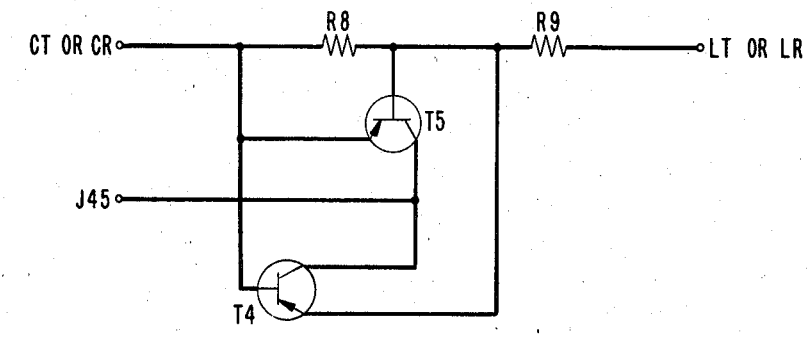
FIG. 3 is a schematic diagram of an alternative overcurrent detection circuit useful in the protection circuit of FIG. 2.

Referring to FIG. 3, overcurrent detection circuit OC may alternatively comprise resistors R8 and R9 connected in series between terminals CT and LT. The base of transistor T5 and the emitter of transistor T4 are connected to the junction of resistors R8 and R9. Similarly, the base of transistor T4 and the emitter of transistor T5 are connected to terminal CT. The collectors of transistors T4 and T5 are connected to terminal J45. When an overcurrent condition of either polarity between terminals LT and CT is sufficient to turn on transistor T4 or T5, current from the collectors of the transistors is applied via terminal J45 to the base of transistor T3. The emitter current of transistor T3 triggers thyristor TH1. The above detection circuit arrangement is duplicated between terminals CR and LR.

While the invention has been shown and described with reference to preferred embodiments it is to be understood that various modifications may be made by one skilled in the art without departing from the spirit and scope of the invention. For example, various component values may be altered to achieve different voltage and current thresholds.

What is claimed is:

1. A protective circuit connected between communication equipment having tip and ring leads and a communication line having tip and ring conductors, the protective circuit comprising
   a six element bridge rectifier (BR1) having three alternating current terminals (AC1, AC2, AC3) and two direct current terminals (PDC, NDC), the alternating current terminals being connected to, respectively, the tip and ring conductors, and to ground, and
   means (OC, OV, TH1) connected between said direct current terminals responsive to a range of predetermined voltage and current conditions in the tip and ring conductors for reflecting foreign electrical energy applied to the tip and ring conductors.

2. Apparatus as in claim 1 wherein the reflecting means includes
   a thyristor (TH1) having a cathode-anode path connected between the direct current terminals of the rectifier, and having a gate,
   and an overvoltage detection circuit (OV) comprising
   first, second and third resistors (R1, R2, R3), each resistor having first and second terminals, the first terminal of the first resistor being connected to one direct current terminal of the rectifier, the second terminal of the first resistor being connected to the first terminal of the second resistor, the second terminal of the second resistor being connected to the first terminal of the third resistor,
   fourth and fifth resistors (R4, R5), each resistor having first and second terminals, the second terminal of the fourth resistor being connected to the first terminal of the fifth resistor, the second terminal of the fifth resistor being connected to the thyristor gate,
   a breakdown diode (ZD1) connected between the first terminal of the first resistor and the first terminal of the fourth resistor,
   a first transistor (T1) having a emitter-collector path connected between the first terminal of the first resistor and the first terminal of the fourth resistor, and having a base connected to the junction of the second and third resistors,
   a second transistor (T2) having a collector-emitter path connected between the second terminal of the third resistor and the junction of the fourth and fifth resistors, and having a base connected to the first terminal of the fourth resistor, and
   a third transistor (T3) having a collector-emitter path connected between the junction of the first and second resistors and the thyristor gate.

3. Apparatus as in claim 2 wherein the thyristor is a silicon controlled rectifier having an anode connected to the positive direct current terminal (PDC) of the rectifier and a cathode connected to the negative direct current terminal (NDC) of the rectifier.

4. Apparatus as in claim 2 wherein the breakdown diode is a zener diode having a cathode connected to the positive direct current terminal of the rectifier and an anode connected to the first terminal of the fourth resistor.

5. Apparatus as in claim 2 wherein the first transistor is a PNP-transistor having an emitter connected to the positive direct current terminal of the rectifier and a collector connected to the junction of the fourth resistor and the breakdown diode.

6. Apparatus as in claim 2 wherein the second transistor is an NPN-transistor having a collector connected to the second terminal of the third resistor and an emitter connected to the junction of the fourth and fifth resistors.

7. Apparatus as in claim 2 wherein the third transistor is an NPN-transistor having a collector connected to the junction of the first and second resistors and an emitter connected to the thyristor gate.

8. Apparatus as in claim 2 wherein the reflecting means includes an overcurrent detection circuit (OC1 or OC2) comprising
   a sixth resistor (R6 or R10) having a first terminal connected to a lead of the communication equipment and a second terminal connected to the corresponding conductor of the communication line,
   an opto-isolator (OP1 or OP2) having an input stage and an output stage, the output stage being connected between a direct current terminal of the bridge rectifier and the junction of the fourth and fifth resistors, one side of the opto-isolator input stage being connected to the first terminal of the sixth resistor, and
   a seventh resistor (R7 or R11) having a first terminal connected to the other side of the opto-isolator input stage, the seventh resistor having a second terminal connected to the second terminal of the sixth resistor.

9. Apparatus as in claim 2 wherein the reflecting means includes an overcurrent detection circuit comprising
   eighth and ninth resistors (R8 and R9), each resistor having first and second terminals, the first terminal of the eighth resistor being connected to one lead of the communication equipment, the second terminal of the eighth resistor being connected to the first terminal of the ninth resistor, the second terminal of the ninth resistor being connected to the corresponding conductor of the communication line,
   a fourth transistor (T4) having a collector-emitter path connected between the junction of the fourth and fifth resistors and the junction of the eighth and ninth resistors, and having a base connected to the first terminal of the eighth resistor, and
   a fifth transistor (T5) havng a collector-emitter path connected between the junction of the fourth and fifth resistors and the first terminal of the eighth resistor, and having a base connected to the junction of the eighth and ninth resistors.

10. Apparatus as in claim 9 wherein the fourth transistor is a PNP-transistor having an emitter connected to the junction of the eighth and ninth resistors and a collector connected to the junction of the fourth and fifth resistors.

11. Apparatus as in claim 9 wherein the fifth transistor is a PNP-transistor having an emitter connected to the first terminal of the eighth resistor and a collector connected to the junction of the fourth and fifth resistors.

* * * * *